Sept. 12, 1944.   A. C. SCAVULLO   2,358,104
COOKING UTENSIL AND METHOD
Filed April 11, 1940

INVENTOR.
Angelo C. Scavullo
By John Howard Joynt
HIS ATTORNEY

Patented Sept. 12, 1944

2,358,104

UNITED STATES PATENT OFFICE 2,358,104

COOKING UTENSIL AND METHOD

Angelo C. Scavullo, New York, N. Y., assignor to Victor K. Scavullo, Frank Scavullo, Charles Scavullo, Marie Scavullo Saegert, and Margaret Scavullo Scott, all of Forest Hills, N. Y.

Application April 11, 1940, Serial No. 329,188

6 Claims. (Cl. 29—148.2)

This application is a continuation in part of my application No. 154,246, filed July 17, 1937, entitled Cooking utensil, and the invention relates to cooking utensils having desirable heat conduction and corrosion resistance characteristics and to a method and apparatus for making such utensils.

One of the objects of my invention is to provide a rugged and durable utensil which is highly resistant to the corrosive attack of foods and also has high lateral heat conductivity so that food placed therein may be heated uniformly without requiring constant attention and without the food being scorched by local hot spots.

Another object is to provide a simple, direct, efficient, and economical method and apparatus for making such a utensil.

Another object is to provide a handle which can be firmly attached to such an utensil in a simple and inexpensive manner.

Other objects will be in part apparent and in part pointed out hereinafter.

The invention accordingly consists in the combination of elements, features of construction and arrangement of parts, and in the several steps and the relation of each of the same to one or more of the others as described herein, the scope of the application of which is indicated in the appended claims.

In the accompanying drawing.

Like reference characters refer to like parts throughout the several views of the drawing.

As conducive to a clearer understanding of certain features of my invention it may be noted at this point that it is desirable to use stainless steel as a material for the construction of cooking utensils because of its superior resistance to the corrosive attack of foods. A serious objection to its use is that it has low heat conductivity. Heat applied to one portion of a pan made solely of stainless steel does not diffuse to the other portions of the pan but remains concentrated in the one portion with the consequence that food on that portion will be burned and food in other portions will not be cooked unless the mass of food is continually stirred.

It has been proposed to make an utensil of stainless steel on the inside and thick copper on the outside as copper possesses excellent heat conductive characteristics. A number of utensils of this character were made by having the two metals tightly fitted together and spot-welded but this previously was not successful due to the danger of a crack forming between the metals and water going into the crack. In one case this crack became partially closed so that, on heating, the steam generated caused a rupture of the vessel. Efforts have been made to electrodeposit or spray copper on stainless steel but without success because the copper tends to peel off and form blisters.

In the prior art, it has been proposed to apply a layer of conductive material to the bottom of a stainless steel vessel by riveting, casting, or other method. A vessel so formed is not satisfactory because heat is not readily conducted to its sides as well as its bottom and consequently the heating of food therein will still be uneven. Furthermore, such a vessel has been found in practice to be defective because of tendencies to become warped and blistered in use. It has also been proposed to construct a vessel with an inner layer of stainless steel, an intermediate layer of mild steel or cuprous alloy and an outer layer of enamel. Such a vessel is obviously inefficient because of the low heat conductivity of enamel, which has the further disadvantage that it becomes chipped when subjected to heavy handling.

According to this invention copper has been successfully united to the sides as well as to the bottom of a stainless steel vessel without any danger of having the copper tend to peel off. Specifically this is accomplished by the interposition of a layer of ordinary steel to which the copper is adapted to adhere better than it does to the stainless steel.

In the past, handles have been secured to cooking vessels by riveting them on. That method of attaching a handle has the disadvantages that it involves several steps and the handle is liable to work loose in heavy use. In my invention I provide for welding the handle to the vessel so that a firm union of pleasing appearance is formed in an operation which is simple and inexpensive.

Figure 1:
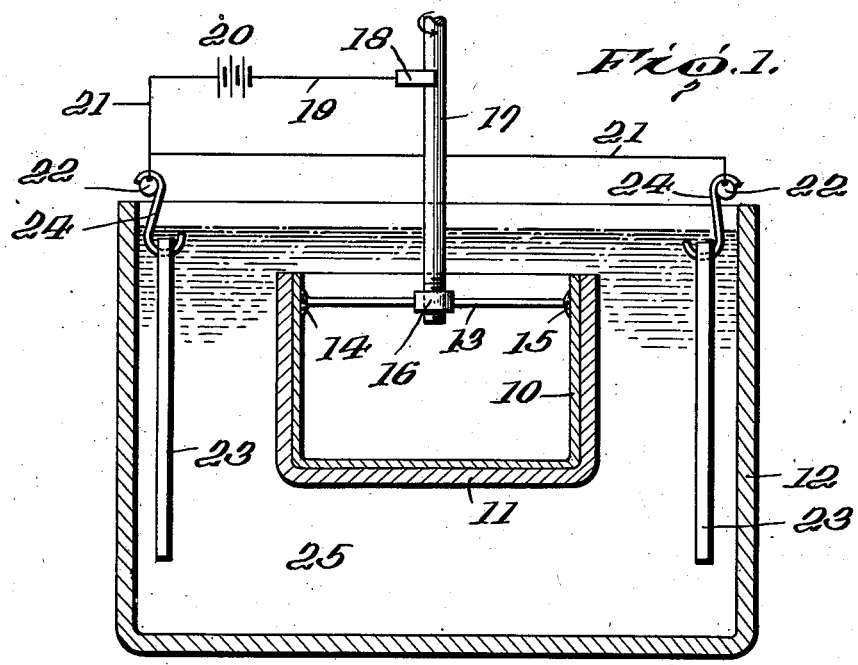
Figure 1 is a diagrammatic representation of the apparatus employed to carry out one step of forming my utensil.

Referring now more particularly to the practice of my invention, attention is directed to Figure 1 of the drawing wherein, illustratively, I have shown a suitable form of my apparatus for applying a copper coating to the vessel by an electroplating process.

The inside portion of the vessel is formed of a layer 10 of stainless steel, that selected being what is known in the trade as 18–8 stainless steel of sufficient thickness to withstand wear for many years. About .050 of an inch has been found appropriate for the stainless steel liner 10 though other dimensions more or less than this amount may be used. The layer 11 is a material which is adapted to be united intimately with the stainless steel and at the same time is also capable of being intimately united with the copper. For this purpose ordinary non-stainless or mild steel is used. The thickness of the mild steel layer 11 may be less, about the same, or greater than the thickness of the stainless steel liner 10, though preferably due to its thermal function in this invention it made thicker than the stainless steel liner. The layers 10 and 11 are intimately united at the mill by heat and rolling and the duplex steel purchased from the mill in sizes and thicknesses desired. After being cut to size the sheet material is shaped between forming dies in order to provide a cooking utensil of the desired kind. In the shaping, of course, care must be taken to see that the stainless steel liner is on the inside because the non-stainless steel is adapted to have copper united thereto in a more satisfactory fashion than the copper is capable of uniting to the stainless steel. In this way the thick copper layer may be indirectly attached to the stainless steel since the liner 11 is intimately united with the stainless steel at the mill.

The outside of the vessel is cleaned by pickling or in other ways and its inner stainless steel surface is coated with beeswax to prevent the depositing of any copper thereon. The vessel is put into position for electroplating in the tank 12. A copper bar 13 is soldered to the inside of the vessel as at 14 and 15 to establish good electrical contact, the bar in turn being mechanically and electrically connected at 16 to a copper shaft 17, which is adapted to be rotated by some suitable means not indicated in the drawing. The shaft 17 is rotated at a speed which will give a linear velocity of approximately 6 feet per minute to the periphery of the vessel for a purpose which is hereinafter referred to, the speed of rotation in revolutions per minute of course depending upon the diameter of the vessel being plated.

The shaft 17 is electrically connected by way of a copper spring contact brush 18 and a lead 19 to the negative terminal of a source of direct current electrical energy such as a storage cell 20. The positive terminal of the source 20 is connected by leads 21 to a metallic rod 22 which is secured in a position near the inside top edge of the tank 12 but insulated from the tank. Copper plates or bars 23 are suspended from the rod 22 on metallic hooks 24, which provide an electrical connection between the rod 22 and the plates 23, the latter forming the anodes of an electrolytic cell. A suitable electrolyte 25 is contained in the tank 12 at a level high enough to completely submerge the vessel being plated. This electrolyte is preferably a copper sulphate solution containing a small amount of sulphuric acid but other solutions may be used. By virtue of its connection to the negative terminal of the source 20, the vessel forms the cathode of the electrolytic cell.

Figure 3:
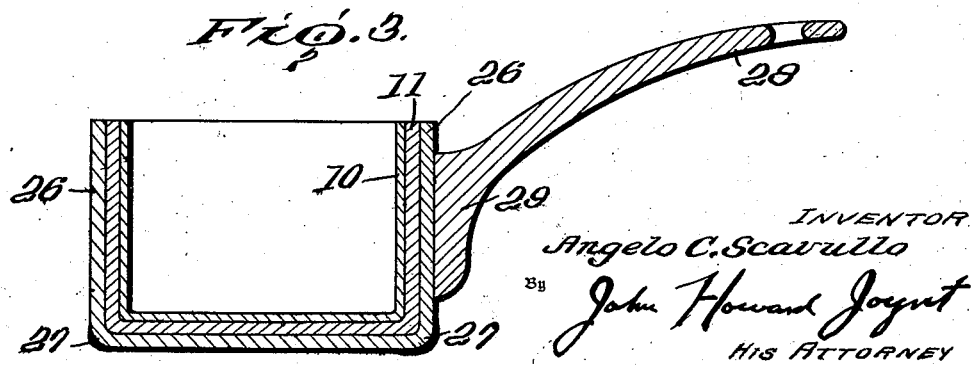
Figure 3 is a cross-sectional view of the completed utensil with the handle attached.

In the plating operation, after all the connections are made, the vessel is rotated at desired speed by the shaft 17. Due to electrolytic action, the copper of the anodes 23 is dissolved in the electrolyte 25 and copper from the electrolyte is in turn deposited on the outer surface of the mild steel layer 11. As indicated above, none is deposited on the stainless steel inner layer because that layer is protected by a coating of beeswax. The deposited copper fills interstices and covers surface irregularities in the layer 11. The electroplating operation is continued until it builds up a layer of copper 26 as shown in Figure 3 of sufficient thickness that the copper forms a path of high heat conductivity.

The method of electroplating described herein is characterized by extreme simplicity in the apparatus required and in operation. The copper coating deposited on the vessel is of uniform thickness except on the bottom edge, where it is desirably somewhat thicker than on other portions of the vessel. Due to stirring of the electrolyte caused by rotation of the vessel no gas bubbles are occluded in the copper coating which is accordingly solid and dense.

Due to the time and current requirements for electrodepositing the large bulk of copper it may be preferred to build up the layer 26 to the desired thickness by the spraying of hot copper particles after a first coat of electrodeposited copper has been applied. The copper is a much better conductor of heat than either the liner 10 or the layer 11 and therefore it assists in evenly distributing heat around the cooking vessel in use so as to prevent as far as possible the formation of local hot spots which might cause burning or scorching of the food whether in liquid or solid form.

In coating the vessel, a coat of copper of thicker cross section than that of the rest of the copper layer is formed at the bottom edge of the utensil. This thickened portion is illustrated at 27 in Figure 3. It serves the function of thermally reinforcing the junction between the bottom and side walls. As a result, better heat conduction is provided between the bottom of the utensil to which the heat is usually applied and the side walls.

After the vessel has had its copper wall built up to the desired thickness, preferably such that the copper and mild steel layers combined are substantially thicker than the stainless steel liner, the outer surface is trimmed and smoothed or finished in any well known manner. The vessel is then ready to have its handle attached.

Figure 2:
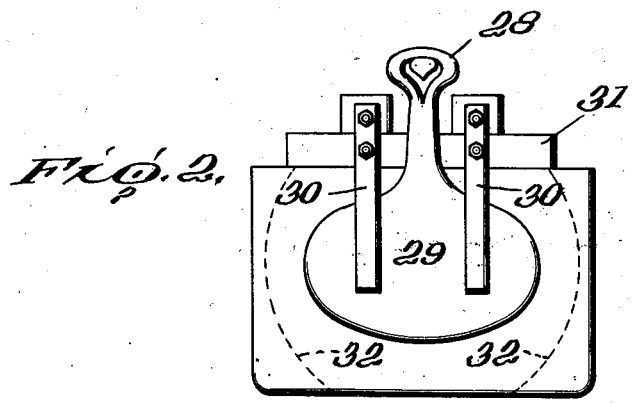
Figure 2 shows the method of attaching a handle to the utensil.

Referring now to Figure 2 it will be seen that the handle 28 has an enlarged lower end 29 which is placed in contact with the side of the vessel and welded thereto. The handle is preferably an alloy containing about 58% copper, 20% zinc, 1% lead and 1% aluminum. Such an alloy has a melting point of about 1800° F. which is slightly below the melting point of the copper coating 26 on the outside of the vessel; copper has a melting point of about 1982° F.

In order to attach the handle its enlarged end 29 is heated to a welding heat and then placed contiguous the copper coating of the utensil where it may be held in place by means of the clamps 30 until welded. In order to prevent bending the walls of the vessel from their desired shape an iron or steel block 31 is made of a size to snugly fit within the vessel to keep the walls from being bent inwardly. If the vessel were made entirely of copper it would be difficult if not impossible to satisfactorily weld the handle because the good conductivity of the copper would distribute the heat from the handle to so large a portion of the vessel walls as to cause them to melt out of shape even if a block were placed inside the vessel. A good weld can be obtained in the present instance because the steel layers are functionally useful not only in mechanically reinforcing the copper during the welding so as to prevent plastic flow of the copper under the pressures used in the welding process, but also in reducing dissipation of heat from the welding area due to the relatively poor heat conductivity of steel. The dotted lines 32 indicate the location of the bluish discoloration in the stainless steel liner after welding which shows that at least the stainless steel does not have time to be heated to any extent sufficient to produce such a discoloration for more than about 20 to 30 degrees away from the ends of the welded handle portion 29.

It is to be understood that the invention contemplates a cooking utensil of any desired shape, the form shown merely exemplifying one of a number of possible and desirable shapes.

The cooking vessel of my invention is characterized by excellent heat conductivity of bottom and side walls. As a consequence, heat applied to the bottom will be distributed over the whole of the bottom and side walls and food within the vessel will be heated uniformly. The increased thickness of copper at the junction between the bottom and sides of the vessel has been found desirable in better distributing the heat up the side walls from the bottom. In other words, it has been discovered that increased and satisfactory heat transfer can be made possible by thickening the copper coating only at the junction between the walls and bottom and without the necessity of having the bottom and side walls of a greater thickness. The thickened edge portion is also desirable because a substantial thickness of copper remains on the edge even after the vessel has been subjected to wear caused by the rough handling encountered in actual practical use.

The particular reason why deposited copper adheres more firmly to the ordinary steel layer 11 than it does to the stainless steel layer 10 is not known nor understood. Moreover, the reason why my vessel is free from warping also is not understood because the stainless steel layer 10 has a coefficient of expansion closer to that of copper than does the layer 11. It was this closeness in coefficients of expansion that may have misled the prior investigators and caused them to exert their efforts toward uniting copper and stainless steel directly. At any rate, these efforts at directly uniting copper and stainless steel have not proven satisfactory and the discovery of this invention appeared at first to be a step in the wrong direction.

However, cooking vessels made under this invention have been tested out for some time and found to be commercially satisfactory. Due to the intimate uniting between the three layers 10, 11, and 26, no protecting bead of stainless steel is necessary to be formed.

A particular advantage of my vessel is its freedom from the warping and blistering which are encountered in vessels of two-ply material after a certain amount of use. The freedom from warping may be due to the fact that the metals having approximately equal coefficients of expansion, namely the stainless steel inner layer and the copper outer layer, counterbalance each other, the relatively thick inner layer of mild steel serving as a stiffener. Whatever may be the true explanation of this property, it forms an important feature of my invention. The other property mentioned, namely freedom from blistering is also very valuable. I attribute this characteristic to the particular process of electroplating employed. Rotation of the vessel during this process insures an even deposit of copper because the rotation causes removal of gas bubbles from the vessel surface. Thus, as the copper layer is formed, no gas is trapped between the copper and the base metal.

Among the advantages of this invention may be mentioned the much improved and neater utensil, the handle of which is united by welding and therefore eliminates the necessity for riveting as has heretofore been customary. A particular advantage of this method of attaching the handle is that no warping of the vessel is caused by it. Such warping would almost inevitably result were the whole vessel to be heated.

Thus it will be seen that there is had in my invention a utensil and method of producing the same in which the various objects hereinbefore set forth, together with my thoroughly practical advantages, are successfully achieved. It will be seen that the vessel is rugged, and well adapted to handling in use, that it is calculated to be free of warping and blistering in use, and that it is designed to give uniform heating through bottom and side walls. Also it will be seen that my utensil is produced in a simple, direct, and efficient manner.

As many possible embodiments may be made of my invention and as many changes may be made in the embodiments hereinbefore set forth, it will be understood that all matter described herein, or shown in the accompanying drawing, is to be interpreted as illustrative and not in a limiting sense.

I claim:

1. The process of forming a culinary vessel which comprises, deep drawing a composite sheet of chromium-nickel stainless steel and low-carbon mild steel to the shape of the desired vessel, with the mild steel outside, and then electroplating copper onto said mild steel to the extent that the sum of the thicknesses of mild steel and copper substantially exceeds the thicknesses of stainless steel.

2. The process of making a culinary vessel which comprises, shaping the vessel out of a composite sheet of chromium-nickel stainless steel and low-carbon steel with stainless steel on the inside and the low-carbon steel on the outside, rotating the shaped vessel in a copper electroplating bath, and electroplating copper on the low-carbon steel outside of the formed vessel while said vessel is continuously rotated.

3. The method of making a cooking vessel which comprises, shaping the utensil out of sheet metal with stainless steel on the inside and non-stainless steel on the outside, electrodepositing a layer of copper on the non-stainless steel outside of the formed utensil, and then spraying heated copper upon the electrodeposited layer and building up the body of copper as a heat conductive medium.

4. A culinary vessel having a bottom and sides comprised of an inner layer of chromium-nickel stainless steeel, an intermediate layer of low-carbon steel, and an outer layer of electrodeposited copper on the low-carbon steel with the sum of the thicknesses of the mild steel and copper substantially exceeding the thickness of stainless steel.

5. A cooking vessel resistant to the attack of various food acids, bases and salts at cooking temperatures and having good heat conducting and distributing properties, said vessel having bottom and side walls comprised of an inner layer of chromium-nickel stainless steel welded to a layer of low-carbon steel and deep-drawn to the desired configuration, and an outermost contiguous layer of copper electroplated to said layer of low-carbon steel, the sum of the thicknesses of said low-carbon steel and copper layers substantially exceeding the thickness of the stainless steel layer, whereby a uniform distribution of heat is had throughout the bottom and side walls of the vessel without warping and blistering of the same.

6. A cooking vessel having a substantially flat bottom with upstanding walls and comprised of an inner layer of stainless steel, a layer of non-stainless steel integral therewith, and an outer layer of copper electrodeposited on the non-stainless steel layer, the non-stainless steel and copper layers being thick enough to facilitate heat conduction through the bottom and sides of the vessel, the copper layer being thickened at the junction of the sides and bottom to facilitate heat conduction from the bottom to the sides.

ANGELO C. SCAVULLO.